United States Patent [19]

Marcinkowski et al.

[11] Patent Number: 5,062,963
[45] Date of Patent: Nov. 5, 1991

[54] METHOD AND APPARATUS FOR REMOVING SLUDGE FROM A SPRAY BOOTH

[75] Inventors: John Marcinkowski, Barrie; Herbert W. Bennett, Orillia; Kenji Niwa, Barrie, all of Canada

[73] Assignee: DeVilbiss (Canada) Limited, Barrie, Canada

[21] Appl. No.: 478,146

[22] Filed: Feb. 7, 1990

[30] Foreign Application Priority Data

Mar. 17, 1989 [CA] Canada .................................. 594020

[51] Int. Cl.$^5$ ............................................ B05B 15/12
[52] U.S. Cl. .................................... 210/712; 118/603; 118/610; 118/DIG. 7; 118/326; 210/97; 210/167; 210/258; 210/259; 210/512.1; 210/513; 210/738; 210/744; 210/787; 210/800; 210/805; 210/806; 417/151
[58] Field of Search ................... 55/228, DIG. 46; 98/115.2; 118/326, DIG. 7, 603-610; 210/100, 167, 195.1, 512.1, 525, 744, 787, 800, 805, 806, 712, 258, 97, 259, 513, 538; 261/29; 427/345; 417/151

[56] References Cited

U.S. PATENT DOCUMENTS

| | | | |
|---|---|---|---|
| 2,981,525 | 4/1961 | Umbricht | 210/167 |
| 4,100,066 | 7/1978 | Bloomer et al. | 210/195.1 |
| 4,102,303 | 7/1978 | Cordier et al. | 118/326 |
| 4,545,295 | 10/1985 | Russell | 98/115.2 |
| 4,607,592 | 8/1986 | Richter | 98/115.2 |
| 4,696,254 | 9/1987 | Spindler | 118/610 |
| 4,948,513 | 8/1990 | Mitchell | 210/712 |

FOREIGN PATENT DOCUMENTS

| | | | |
|---|---|---|---|
| 2353469 | 4/1975 | Fed. Rep. of Germany | 210/167 |
| 8100097 | 1/1981 | World Int. Prop. O. | 210/787 |
| 8202543 | 8/1982 | World Int. Prop. O. | 210/805 |

OTHER PUBLICATIONS

Toms, "Improved Pretreatment at Kurt", reprint from Sep. 1986, Products Finishing.
Lister, "Hydrocyclone Design Variables in Filtration-Separation Operations", reprint from Sep.-Oct. 1985 Filtration News.
Brochure for Spirelpak 136 Cleaning System, date unknown.
Brochure for Liquid-Life Separator Systems, date unknown.
Specification sheets for the Liquid-Life Model Nos. 50, 500 and 1200 Separator Systems, date unknown.
Specification sheet for the BEX MP series tank mixing eductors, date unknown.
"Installation, Operation and Maintenance Manual" for a Water-Wash Paint Booth Sludge Separator published by Liquid-Life Separator Systems, Flyer for RAVE Sludge Removal Systems, date unknown.
Advertisement flyer for a Spraybooth Water Treatment System by Rave Sludge Removal Systems, date unknown.

Primary Examiner—Robert A. Dawson
Assistant Examiner—Joseph Drodge
Attorney, Agent, or Firm—MacMillan, Sobanski & Todd

[57] ABSTRACT

An improved method and apparatus for removing sludge from a spray booth tank using a single pump for withdrawing liquid including sludge from the tank. A portion of the liquid from the pump is returned to the tank through eductors for agitating liquid in the tank. At least a portion of the liquid from the pump flows through a hydrocyclone separator. Sludge from the separator is collected in a settling tank. A small portion of the clarified liquid from the separator flows through an aspirator pump to the booth tank and the remainder of the clarified liquid is returned directly to the booth tank. The aspirator pump returns excess liquid from the settling tank to the booth tank.

6 Claims, 3 Drawing Sheets

METHOD AND APPARATUS FOR REMOVING SLUDGE FROM A SPRAY BOOTH

TECHNICAL FIELD

This invention relates to paint spray booths and more particularly to an improved method and apparatus for removing paint sludge from a water wash paint spray booth.

BACKGROUND ART

For environmental protection and personnel safety, spray booths are normally used in commercial paint spraying operations to collect paint overspray and evaporated paint solvents. In one type of spray booth, the paint overspray and air circulated through the booth is contacted with water. The air is scrubbed with the water to decrease stack emissions. The water and entrained paint and solvent circulated through the booth flow to a tank and hence are recirculated through the booth. The paint tends to float on the water and forms a sticky mass which tends to coat the walls of the spray booth and pumps, headers, nozzles and venturis. Frequent maintenance is required to clean the spray booth to keep it operating efficiently. As paint deposits decrease the operational efficiency of a booth, stack emissions increase. Spray booth maintenance can be reduced by adding chemicals to the water to cause the paint to coagulate into non-tacky solid particles which can sink in the tank and accumulate at the bottom of the tank as a sludge. In some spray booths, liquid in the tank is highly agitated to maintain the sludge in suspension during operation. Unless removed by other means, the spray booth must be shut down periodically, drained and the sludge is manually removed from the tank. The liquid removed from the spray booth tank is considered hazardous waste because of the paint, paint solvent and chemicals in the liquid. Disposal of this waste is quite expensive since it contains large amounts of water. For high production systems, frequent maintenance is required.

An improved water wash spray booth system is shown in U.S. Pat. No. 4,696,254. In this system, liquid including water, chemical additives and paint sludge flows from a number of spray booths to a sludge pit. In the pit, the liquid is continuously recirculated and agitated by a first pump to maintain the sludge in suspension. A second pump circulates liquid from the sludge pit through a hydrocyclone separator to separate the solids from the liquid and the clarified liquid from the separator is returned to the sludge pit. The solids are collected in a barrel along with a small quantity of liquid. A portion of the pit liquid from the second pump outlet also is circulated through an aspirator or siphon pump and back to the pit. The aspirator pump removes excess liquid from the sludge collection barrel. Since liquid containing paint sludge is circulated through the aspirator pump, the pump will require periodic maintenance. The expense of disposing of the hazardous waste from the spray booth may be significantly reduced by this system since most of the water has been removed from the waste sludge in the barrel.

DISCLOSURE OF INVENTION

According to the invention, an improved method and apparatus are provided for removing paint sludge from a tank for a water wash paint spray booth. The apparatus is efficiently operated using only a single pump for agitating liquid in the booth tank, for circulating liquid containing sludge through a sludge separator and for returning liquid to the tank. The single pump withdraws liquid from the tank and returns a portion of the liquid through eductors which agitate the liquid in the tank to maintain paint sludge in suspension. The pump also supplies a portion of the liquid to a hydrocyclone separator which separates the sludge from nearly all of the liquid. The sludge and a small quantity of liquid are collected in a settling tank and the clarified liquid from the separator is returned to the booth tank. A portion of the returned liquid flows through an aspirator pump which removes excess liquid from the settling tank. Thus, only clarified liquid flows through the aspirator pump.

Accordingly, it is an object of the invention to provide an improved method and apparatus for removing paint sludge from a tank for a water wash paint spray booth.

BEST MODE FOR CARRYING OUT THE INVENTION

Figure 1:
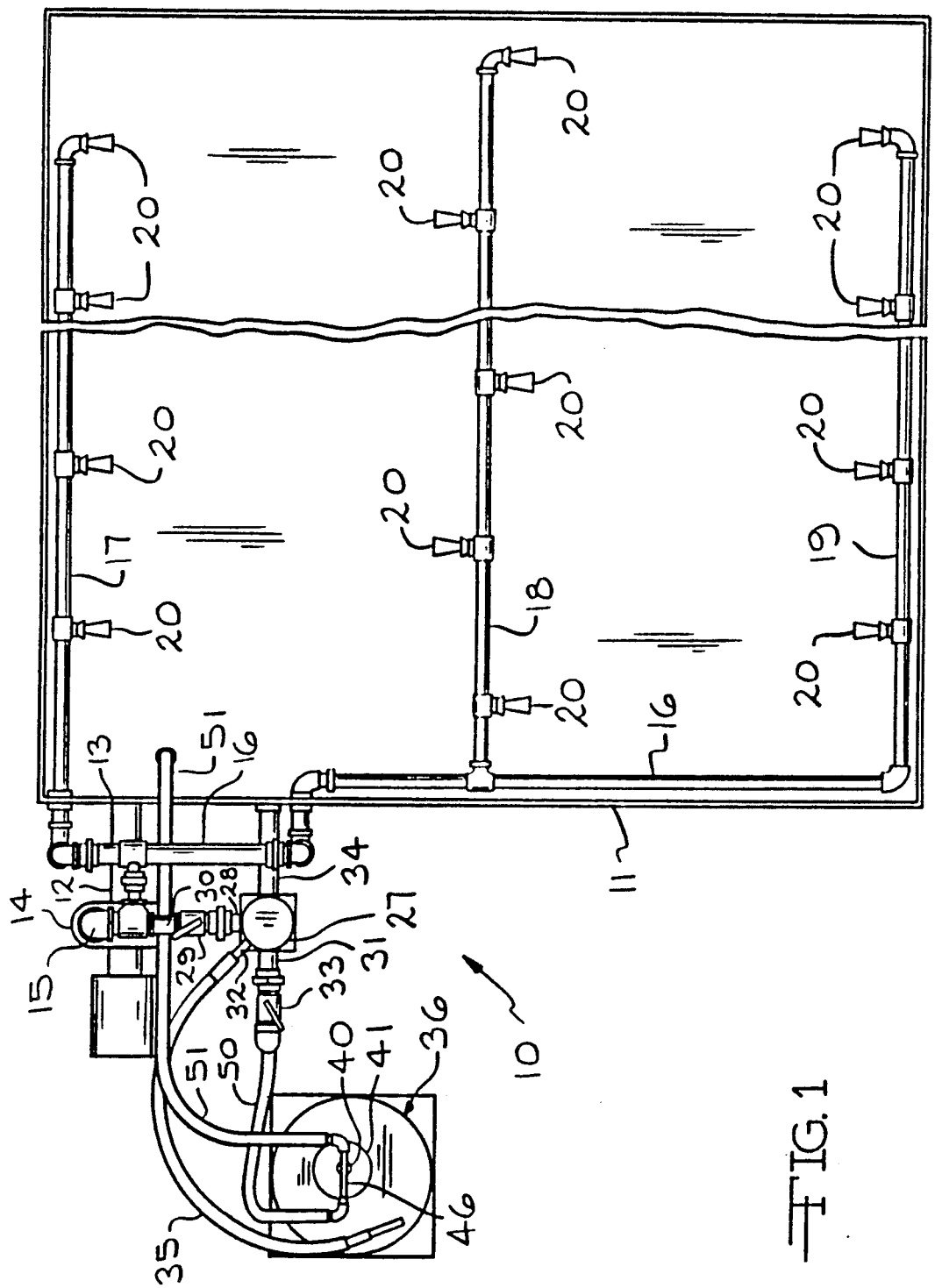
FIG. 1 is a fragmentary plan view of apparatus for removing sludge from a paint spray booth including a paint booth tank and a hydrocyclone sludge removal system.
Figure 2:
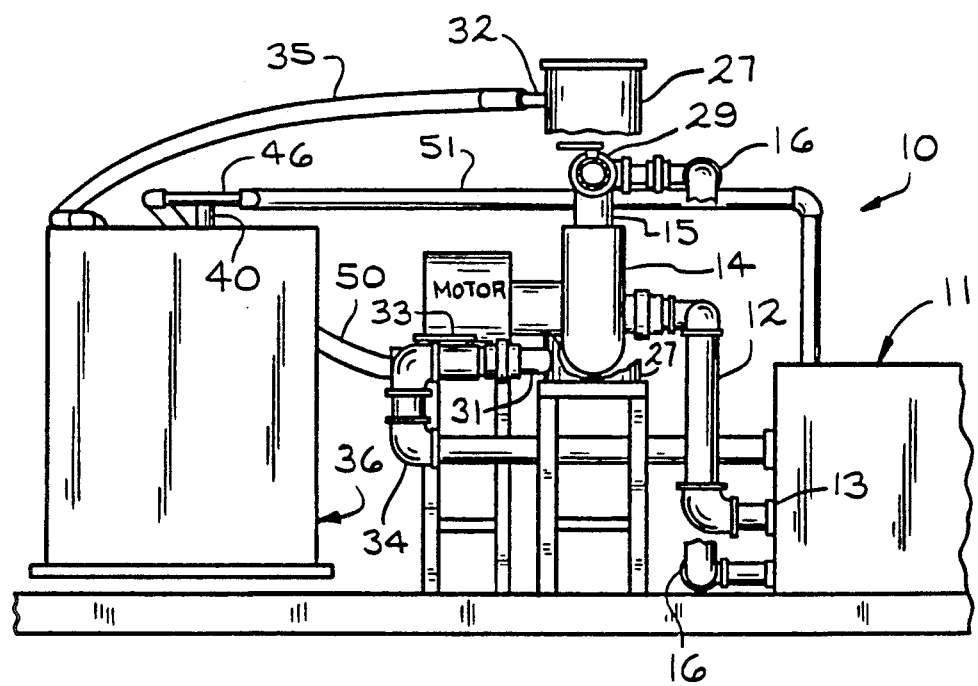
FIG. 2 is a fragmentary and partially broken away side elevational view of the apparatus of FIG. 1.
Figure 3:
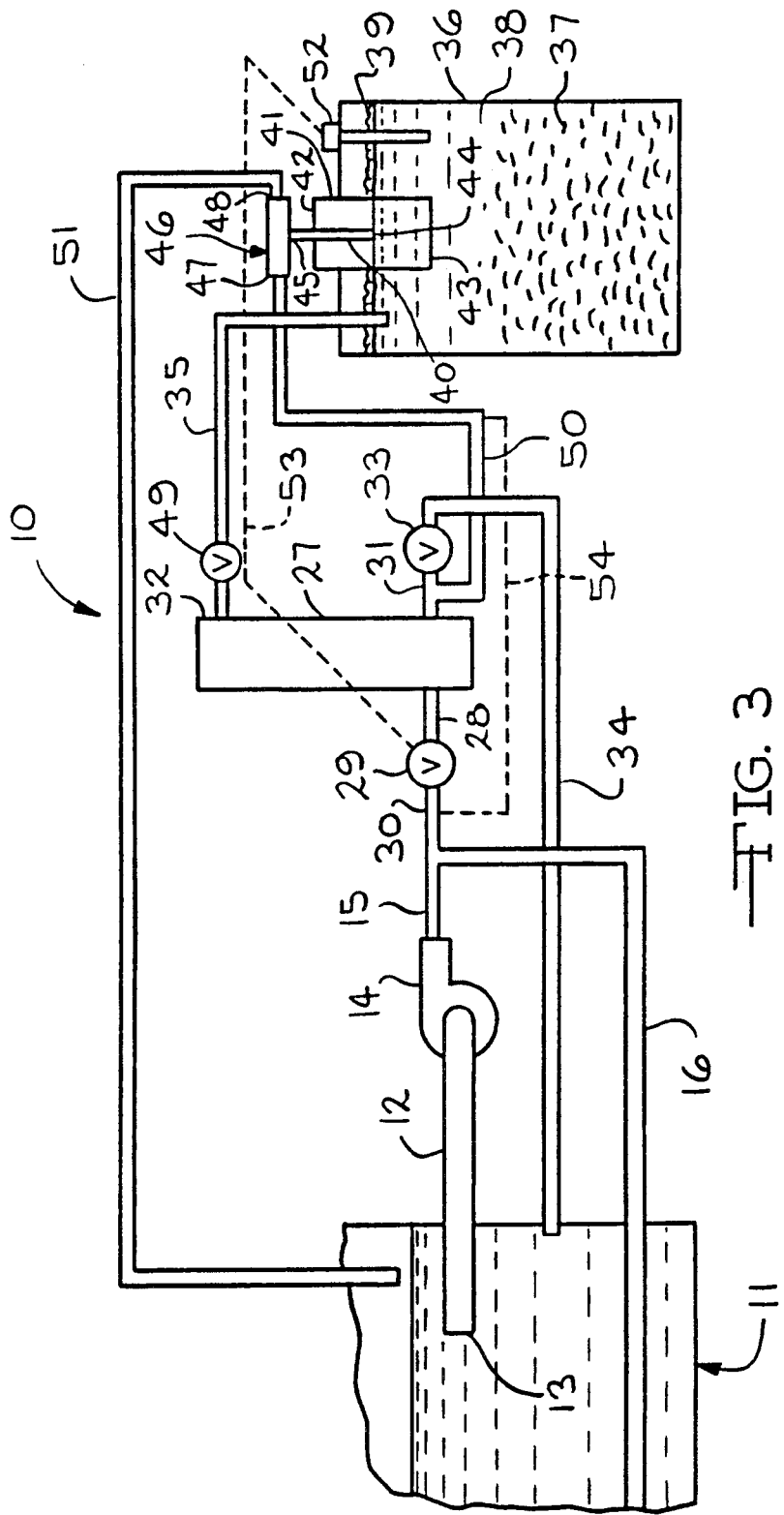
FIG. 3 is a fragmentary diagrammatic illustration showing the liquid connections for the apparatus of FIG. 1.

Referring to FIGS. 1-3, apparatus 10 is illustrated for removing paint sludge from a water wash spray booth tank 11 in accordance with the invention. The tank 11 typically forms a lower back portion of a spray booth and may be located, for example, below a water curtain and/or an air scrubber at the back of the booth. Paint overspray is directed against the water curtain where the overspray is entrained in the falling water. Also, air exhausted through the booth is scrubbed by contacting with booth water. Commercially available chemicals are added to the water to cause the entrained paint to coagulate into non-tacky particles which can sink in the water. Preferably, the chemicals also reduce foam which tends to accumulate on the surface of the tank liquid.

A pipe 12 has an inlet end 13 connected to the tank 11 at a point below the liquid surface in the tank 11. The pipe 12 delivers tank liquid including the suspended coagulated paint particles to a pump 14. The pump 14 has a high pressure outlet 15 connected through a return pipe 16 to the tank 11. The return pipe 16 is connected to several distribution pipes 17-19 extending along the bottom of the tank 11. Liquid returned to the tank 11 through the pipes 17-19 is discharged through a plurality of eductors 20.

Figure 4:
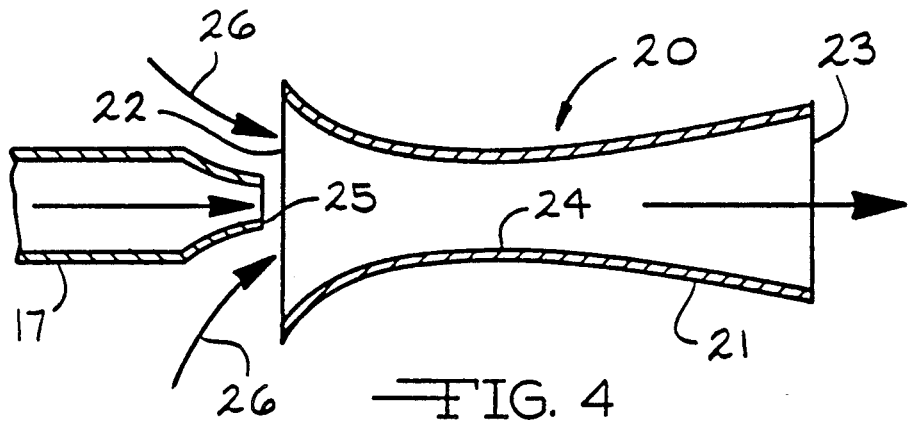
FIG. 4 is a diagrammatic cross sectional view of an eductor for agitating liquid in the spray booth tank shown in FIG. 1.

The eductors 20 are designed to produce a high turbulence in the tank 11 to maintain the coagulated paint particles or sludge in suspension. Otherwise, the sludge will tend to sink and form a layer which must be periodically removed from the bottom of the tank 11. The eductors 20 are commercial products manufactured for agitating chemicals in tanks. An exemplary eductor 20 is diagrammatically illustrated in FIG. 4. The eductor 20 includes a horn 21 having open ends 22 and 23 and a constricted center 24 forming a venturi. A liquid nozzle 25 connected to one of the distribution pipes, pipe 17 is illustrated, is directed into the horn 21 to direct a liquid jet through the horn 21. The liquid jet induces through suction an additional liquid flow from the tank through the horn 21, as illustrated by the arrows 26. A typical eductor 20, for example, may induce four gallons of tank liquid to enter the horn 21 for each gallon of liquid discharged from the nozzle 25. The eductors 20 are effective for maintaining a high liquid turbulence in the tank 11 to cause the chemicals in the water to mix with and coagulate the entrained paint and to maintain the coagulated paint particles in suspension.

Referring again to FIGS. 1-3, the apparatus 10 further includes a hydrocyclone separator 27 (shown in fragmentary in FIG. 2) having an inlet connected through a pipe 28, a valve 29 and a pipe 30 to the pump outlet 15. The hydrocyclone separator 27 is a commercially available device which is capable of removing particulate matter, such as coagulated paint particles, from liquid. The separator 27 may be, for example, a SpirEL Pak 136 hydrocyclone separator sold by ELP Products, Ltd. of Calgary, Alberta, Canada. Depending on the size of the spray booth and the liquid flow desired, either a single hydrocyclone separator may be used or a plurality of separators may be connected in parallel. The separator 27 has a filtered or clarified liquid outlet 31 and a sludge outlet 32 which discharges the separated particulate matter along with a small quantity of liquid. Clarified liquid from the outlet 31 is returned through a valve 33 and a pipe 34 to the spray booth tank 11.

The sludge outlet 32 from the separator 27 is connected through a pipe 35 and a valve 49 to discharge the sludge into a settling tank 36. As the apparatus 10 is operated, sludge 37 accumulates in the tank 36 and relatively clear liquid 38 will accumulate above the settled sludge 37. Also, some foam 39 may accumulate on the surface of the liquid 38. To prevent the liquid 38 from overflowing the tank 36, excess liquid is withdrawn from the tank 36 through a pipe 40. A cylinder 41 having an open top 42 and an open bottom 43 is positioned to extend downwardly into the liquid 38, through the floating sludge or foam 39, and to surround an bottom inlet 44 to the pipe 40 to prevent the floating sludge or foam 39 from entering the pipe 40.

The pipe 40 is connected to a suction inlet 45 of an aspirator pump 46. The aspirator pump 46 also has a pressure inlet 47 and an outlet 48. A portion of the clarified liquid from the hydrocyclone separator outlet 31 is delivered through a pipe 50 to the pressure inlet 47 of the pump 46. Alternately, the pressure inlet 47 may be connected through a pipe 54 (shown in dashed lines) to receive liquid from the pipe 30. The outlet 48 is connected through a liquid return pipe 51 to the spray booth tank 11. In operation, a relatively small flow of clarified liquid from the separator 27 through the pump 46 produces suction through the pipe 40 to draw excess liquid 38 from the settling tank 36 at a point below the surface floating sludge or foam 39 and above the level of the sludge 37. Since substantially all of the sludge has been separated from the liquid flowing through the aspirator pump 46, very little maintenance is required for the pump 46.

Optionally, a sludge level sensor 52 may be mounted to extend into the settling tank 36. The sensor 52 is positioned to indicate when the sludge is at a predetermined maximum level below the bottom inlet 44 on the pipe 40. As illustrated by the dashed line 53, the sensor 52 may be connected to close the valve 29 and thereby interrupt operation of the hydrocyclone separator 27 when the settling tank 36 becomes substantially full. The sensor 52 also may operate an alarm (not shown) to notify a system operator when the settling tank 36 is full. In either case, use of the spray booth need not be interrupted while an empty tank is substituted for the full settling tank 36. The pump 14 will continue to agitate liquid in the spray booth tank 11 to mix chemicals with the entrained paint overspray and to maintain the sludge in suspension.

In a modified embodiment of the invention, all liquid from the pump 14 can be circulated through the separator 27. In this embodiment, the clarified liquid from the separator 27 would be returned to the booth tank 11 through the eductors by connecting the pipe 34 to the pipe 16. However, this embodiment will require a significantly larger capacity separator 27 and may require a larger capacity pump 14 to overcome a greater pressure drop in the system. It will be appreciated that various other modifications and changes may be made in the above described embodiment of the invention without departing from the spirit and the scope of the following claims.

We claim:

1. A method for removing paint sludge from a tank for a water wash paint spray booth comprising the steps of:
    a) adding a material to the water in said booth tank to cause tacky paint and water to form a liquid containing suspended non-tacky paint sludge particles;
    b) continuously withdrawing a portion of the liquid from said booth tank with a single liquid pump;
    c) returning to said booth tank at least a portion of the withdrawn liquid from said pump through a plurality of eductors located in said booth tank to maintain such paint sludge particles in suspension;
    d) circulating at least a portion of the withdrawn liquid from said pump through a hydrocyclone separator to remove paint sludge particles from such liquid and returning clarified liquid from said separator back to said booth tank;
    e) collecting such removed paint sludge particles and a limited quantity of tank liquid from said hydrocyclone separator in a settling tank; and
    f) circulating a portion of the clarified liquid from said separator through an aspirator pump and thence to said booth tank, said aspirator pump having a suction inlet located in said settling tank for returning excess liquid from said settling tank to said booth tank.

2. A method for removing paint sludge from a tank for a water wash paint spray booth, as set forth in claim 1, and further including the step of interrupting the flow of liquid to said hydrocyclone separator when said settling tank contains a predetermined quantity of paint sludge.

3. A method for removing paint sludge from a tank for a water wash paint spray booth, as set forth in claim 1, wherein all of the withdrawn liquid is circulated through said separator and wherein clarified liquid from said separator is returned through said eductors.

4. Apparatus for removing paint sludge from a tank for a water wash paint spray booth comprising a liquid pump having an inlet connected to receive liquid from a paint spray booth tank and having an outlet, a plurality of eductors located in said tank, a first pipe means for returning liquid from said pump outlet through said eductors to said booth tank, said liquid returned through said eductors agitating liquid in said booth tank to maintain paint sludge in suspension, a hydrocyclone separator having an inlet, a clarified liquid outlet and a sludge outlet, a second pipe means for delivering liquid from said pump outlet to said separator inlet, a third pipe means for returning liquid from said separator clarified liquid outlet to said booth tank, a settling tank for collecting paint sludge and liquid from said separator sludge outlet, an aspirator pump having a pressurized liquid inlet, an outlet and a suction inlet, means for circulating liquid from said separator clarified liquid outlet through said aspirator pump pressurized liquid inlet and said aspirator pump outlet to said booth tank, and liquid inlet means in said settling tank connected to said suction inlet for returning excess liquid from said settling tank to said booth tank.

5. Apparatus for removing paint sludge from a tank for a water wash paint spray booth, as set forth in claim 4, and wherein said liquid inlet means includes means for separating any foam accumulated in said settling tank from liquid removed from said settling tank.

6. Apparatus for removing paint sludge from a tank for a water wash paint spray booth, as set forth in claim 4, and further including means for interrupting flow of liquid to said hydrocyclone separator inlet when said settling tank contains a predetermined quantity of paint sludge.

* * * * *